United States Patent [19]

Yamaguchi et al.

[11] 4,376,854
[45] Mar. 15, 1983

[54] PROCESS FOR PREPARING RESORCINOL COPOLYMERS

[75] Inventors: Toyohiko Yamaguchi, Chiba; Koichi Kashima; Nobuo Kaifu, both of Tokyo, all of Japan

[73] Assignee: Hodogaya Chemical Co., Ltd., Tokyo, Japan

[21] Appl. No.: 365,790

[22] Filed: Apr. 5, 1982

[30] Foreign Application Priority Data

Apr. 10, 1981 [JP] Japan .................................. 56/53024
Apr. 10, 1981 [JP] Japan .................................. 56/53025

[51] Int. Cl.$^3$ .......................... C08G 8/20; C08G 8/22; C08G 8/24
[52] U.S. Cl. .................................. 528/137; 525/442; 525/501; 528/139; 528/140; 528/143; 528/144; 528/145; 528/155; 428/480; 428/482
[58] Field of Search ............... 528/155, 137, 143, 144, 528/145, 139, 140

[56] References Cited

U.S. PATENT DOCUMENTS

| | | | |
|---|---|---|---|
| 2,477,641 | 8/1949 | Nagel | 528/155 X |
| 2,878,198 | 3/1959 | Ingram et al. | 528/147 X |
| 3,437,610 | 4/1969 | Moult | 528/155 X |
| 3,835,082 | 9/1974 | Wright | 528/155 X |
| 4,009,304 | 2/1977 | Dixon et al. | 528/155 X |
| 4,112,160 | 9/1978 | Kako et al. | 528/155 X |

Primary Examiner—Howard E. Schain
Attorney, Agent, or Firm—Austin R. Miller

[57] ABSTRACT

A process for preparing a resorcinol copolymer, comprising at least one specific phenol with formaldehyde at a certain mole ratio to obtain a resol-type precondensate containing 1 to 30% of residual unreacted formaldehyde and then adding said resol-type precondensate to a mixture of an acid catalyst and at least one resorcinol to effect co-condensation. The obtained copolymer is useful for an adhesive for polyester fiber and rubber.

16 Claims, No Drawings

PROCESS FOR PREPARING RESORCINOL COPOLYMERS

The invention relates to an improved process for preparing copolymers of meta-substituted phenols and resorcinols. More particularly, the invention relates to a process for preparing novolak-type copolymers useful as an adhesive for polyester textile materials, in which an improved reaction is employed for the co-condensation of a resol-type precondensate of an meta-substituted phenol with a resorcinol.

Polyester fiber has a high modulus of elasticity as compared with nylon fiber and is excellent in dimensional stability and flat spotting does not occur easily. For these reasons, the polyester fiber is now prevailing over the nylon fiber for use as tire cords in automobile tires. Nevertheless, the polyester fiber has some disadvantages. The primary disadvantage is difficulty in bonding, which is inherent to the molecular structure of polyester. To solve this problem, various improvements made on processes for preparing adhesives for the polyester fiber or methods for bonding the polyester fiber have been reported.

For example, in Japanese Patent Publication No. 55-45088, a resin is prepared in such a manner that a resol-type precondensate containing no unreacted formaldehyde is obtained in the presence of an alkaline catalyst and is allowed to effect co-condensation with resorcinol by distilling off water. This method, however, is not useful as an industrial process because gelation is caused by the condensation of the produced resol type material. In Japanese Patent Publication No. 46-11251, substituted phenols to be employed are restricted to para-substituted phenols and ortho-substituted phenols, in which at least two of the 2-, 4- and 6-positions are left unsubstituted to obtain linear polymers. The resultant copolymers, however, do not have a sufficient reactivity, resinification ability into three dimensions and adhesive value. In Laid-open Japanese Patent Application No. 49-37986 (Japanese Patent Publication No. 52-25874), novolak-type copolymers are obtained by a two-stage method, in which a univalent phenol and formaldehyde are partially reacted in the presence of an acid catalyst and further reacted with a resorcinol to effect co-condensation. According to this method, however, there can not always be obtained such a structure that the resorcinol is located at the outside of a molecule, and the obtained resin is somehow poor in hydrophilic nature and adhesive value.

As a result of extensive studies for overcoming the above-mentioned drawbacks, the inventors have established a process capable of easily providing, on an industrial scale, copolymers of m-substituted phenols and resorcinols which have a high stability and prominent adhesion as a one-stage adhesive for bonding polyester textile material to rubber.

Thus, the present invention provides a process for preparing a resorcinol copolymer, comprising reacting at least one phenol having the general formula,

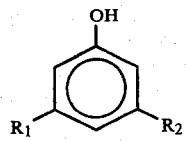

in which $R_1$ is —$CH_3$ or —$OCH_3$, and $R_2$ is hydrogen or —$CH_3$, with formaldehyde in an amount of 0.6 to 2.4 moles per mole of said phenol, in the presence of an alkaline catalyst, to obtain a resol-type precondensate containing 1 to 30%, based on the initial amount, of residual unreacted formaldehyde, and, then, adding said resol-type precondensate to a mixture of an acid, equivalent to said alkaline catalyst or 10 mol % excess, with reference to said phenol, and at least one member selected from the group consisting of resorcinol and lower alkyl-substituted resorcinols, in an amount of 0.4 to 2.5 moles per mole of said phenol, to effect co-condensation.

As an alkaline catalyst, there can be used known alkaline catalysts, such as hydroxides or carbonates of alkali metals or alkaline earth metals. The amount of the catalyst is 0.01 to 10 mol %, preferably 0.3 to 5 mol % based on the phenols.

Although the reaction to obtain the resol-type precondensate is carried out in an aqueous medium, it may be effected in a combined solvent system of water and an organic solvent. In the latter case, it is preferred to use an organic solvent which can dissolve the material phenols and the resultant resol type precondensate, such as aliphatic alcohols, e.g., methyl alcohol and ethyl alcohol, and aliphatic ketones, e.g., acetone and methyl ethyl ketone.

A first characteristic feature of the present invention is in the structure of the univalent phenols to be used, as represented by the above-mentioned general formula. They are meta-substituted phenols having hydrogen atoms in the 2-, 4- and 6-positions and having little steric hindrance from the substituent and, thus, having a high reactivity. In addition, these phenols have such a structure that the solubility parameters of the resultant copolymers of the phenols and the resorcinols are similar to that of polyester. As preferred examples of the phenols usable for the present invention, there may be mentioned m-cresol, 3,5-xylenol and m-methoxyphenol. In general, meta-substituted phenols are difficult to prepare and are often expensive, but those as mentioned above are easily available and suitable for attaining the purpose of the present invention.

A second characteristic feature of the present invention is to leave 1 to 30%, preferably about 2 to 10%, of formaldehyde unreacted on the basis of the charged amount of formaldehyde.

The reaction conditions for obtaining resols are important because they have a significant effect on the performance, especially on the adhesion, of the resorcinol copolymers of the final products. This reaction, in general, is accompanied by large heat generation and the resol type precondensates are not stable to heat, so that if the reaction proceeds too far, i.e., if the amount of the unreacted formaldehyde is reduced to lower than about 1% of the charged amount, undesirable by-products, such as benzyl ether type compounds, are generated by dehydration. If the reaction conditions are too gentle, for example, if the amount of the unreacted formaldehyde is more than 30% based on the charged amount, the unreacted formaldehyde is reacted with resorcinols during the reaction to produce novolak and the percentage of the desired novolak copolymers is reduced, which deteriorates the performance of the copolymers as adhesives. To solve these problems, the amount of the unreacted formaldehyde is controlled in the present invention so as to fall within the range as specified above.

In the present invention, the molar ratio of the formaldehyde to the phenols is important to obtain copolymers having a desirable molecular weight distribution and is preferably 0.6 to 2.4, more preferably 0.8 to 2.2.

The reaction to obtain the resol-type precondensate may suitably be carried out at a temperature ranging from 10° to 90° C., preferably 25° to 70° C. More particularly, the reaction temperature should be suitably selected depending upon other conditions, such as combinations of the nature of phenols, the amount of the catalyst and the reaction time.

Generally, the reaction to obtain the resol-type precondensate may proceed at a higher reactivity in the order of m-cresol, 3,5-xylenol and m-methoxyphenol. On the other hand, as the amount of the catalyst is increased, the reaction temperature can be lowered, and, further, the reaction temperature is one of the factors for determining the reaction time. Therefore, it is desirable, for process control, to select the reaction temperature so that the reaction terminates within 1 to 24 hours, preferably 2 to 10 hours.

A third feature of the present invention lies in the method for condensation of the resol precondensate and a resorcinol. Conventionally, an acid catalyst and a resorcinol may be added to the resol mixture to obtain novolak. This method has an advantage in that it can be conducted using one vessel, but an undesired side reaction between the resol precondensates to produce novolak is caused by the acid added. In addition, as the condensation reaction proceeds rapidly, complicated procedures are necessary for process control so as to gradually raise the reaction temperature and this involves some hazards.

The present invention is characterized by such a method that a mixture of an acid, equivalent to the alkaline catalyst or 10 mol % excess with reference to the phenols used and at least one resorcinol, selected from resorcinol and lower alkyl-substituted resorcinols, is allowed to gradually react with the resol precondensate. More specifically, according to the conventional method, wherein a mixture of an acid and a resorcinol is added to the resol reaction mixture, the resol precondensate itself is changed by the heating during the reaction. In contrast, according to the present invention, the procedures are reversed, i.e., the resol reaction mixture is added to the mixture of an acid and a resorcinol to solve all the problems described above. The resol precondensate to be added may be used in the cooled condition and thermal changes with the lapse of time can be suppressed.

The acid catalyst used for co-condensation is equivalent to the alkaline catalyst or 10 mol %, preferably 0.1 to 3 mol % excess with reference to the phenols. The acid catalyst may be known hydrochloric acid, sulfuric acid, nitric acid, formic acid, oxalic acid, acetic acid or p-toluenesulfonic acid.

The amount of the acid catalyst is preferred to be as small as possible, because it remains in the product resin.

The lower alkyl-substituted resorcinols usable for the present invention may suitably have a lower alkyl substituent having 1 to 4 carbon atoms to obtain a copolymer having a satisfactory adhesive force. As examples of suitable resorcinols, there may be mentioned resorcinol, 5-methylresorcinol, 5-ethylresorcinol, 5-propylresorcinol, 5-iso-propylresorcinol, and 5-butylresorcinol. A mixture of lower alkyl-substituted resorcinols commercially available under the Trade Mark "ALKYRES" may also be employed.

"ALKYRES" is an alkylresorcinol mixture having a boiling point of 270° to 290° C., obtained by the dry distillation of oil shale and the fractional distillation of the resultant divalent phenol mixture. This mixture is a pale yellow to red-brown paste having an average molecular weight of about 140 and contains 75 to 80% of 5-methylresorcinol (45 to 55%), 5-ethylresorcinol, 2,5-dimethylresorcinol and 4,5-dimethylresorcinol and 20 to 25% of other lower alkyl-substituted resorcinols. Such an alkylresorcinol mixture may also be employed as a crude product, without purification by the fractional distillation mentioned above.

The amount of the resorcinols to be used in the present invention is preferably 0.6 to 1.4 equivalents per one equivalent of the methylol group of the resol type precondensate and within 0.4 to 2.5 times, in molar ratio, with reference to the phenols. Since the major portion of the formaldehyde used is reacted, and the number of the methylol groups in the resulting resol type precondensate is substantially the same as the number of the resorcinol molecules used, there can be obtained by condensation reaction a copolymer having resorcinol units at the end.

Although a small amount of water is used in the co-condensation reaction for dissolving or suspending the resorcinols, other solvents may be used in combination with water.

The molecular weight distribution of the obtained copolymers can be determined from a waveform obtained by gel permeation chromatography, and, it is preferred, in view of the actual adhesive force of the copolymers, that the average molecular weight range from 250 to 1500, preferably 280 to 800.

The so-obtained copolymers can be used as an adhesive in the form of the reaction mixture as it is, but it may be desirable to convert the copolymers into a fusible resin by removing the residual monomers by a conventional separation method, such as distillation or extraction, and then use the fusible resin as an aqueous solution or dispersion.

The copolymers produced according to the present invention have excellent properties with respect to adhesive performance and handleability as compared with those obtained by conventional methods. Thus, the industrial value of the present invention is very high.

The copolymers of the present invention are superior in adhesive performance to VULCABOND-E, which is a one-stage type adhesive manufactured by Imperial Chemical Industries Limited (I.C.I.) and widely used for bonding rubber and polyester fiber. The copolymers have a handleability higher than that of VULCABOND-E and a high storage stability inherent to a novolak type resin.

The copolymers obtained according to the present invention are characteristically used in an adhesive treatment liquid for polyester fiber. More specifically, the copolymers are used in combination with RFL, which is a mixture of an alkaline precondensate of resorcinol and formaldehyde and a rubber latex.

As already known, RFL is generally prepared by condensing 1 mol of resorcinol and 1 to 4 mols of formaldehyde in the presence of an alkaline catalyst, such as sodium hydroxide, potassium hydroxide or ammonium hydroxide, and mixing the resultant condensate with one or more latexes selected from vinylpyridine.styrene.butadiene latex, styrene.butadiene latex, polybutadiene latex, natural rubber latex, and the like.

As the percentage of the two components of the adhesive treatment liquid, it is preferred that the copolymer solids content be 30 to 50% and RFL be 50 to 70% based on the total solid weight of the adhesive.

The polyester fiber is dipped in the adhesive treatment liquid or is applied with the adhesive by another suitable method and subjected to heat treatment at a temperature of from 200° to 250° C. The so-treated cord is embedded in unvulcanized rubber and bonded by vulcanization.

There will now be described, in detail, the process of the present invention by way of example; a comparative process by way of comparative examples; and the result of adhesion evaluation for the copolymers obtained by the respective processes and used as adhesives for bonding polyester fiber to rubber by way of a reference example.

In the following, "part" or "parts" means "part by weight" or "parts by weight" unless otherwise defined.

70° C., and the reaction mixture of m-cresol and formalin was gradually added dropwise over 3 hours to the mixture being stirred in the flask. The resultant mixture was further stirred at the same temperature for another 3 hours. Water in the system was removed and the unreacted m-cresol and resorcinol were removed by vacuum distillation, with a final vacuum pressure of 8 mmHg, to obtain 700 parts of m-cresol.resorcinol.formaldehyde resin (A).

The obtained resin was an orange-colored solid of a fusible oligomer having a softening point of 110° C. and an average molecular weight of 500.

EXAMPLES 2 THROUGH 7 AND COMPARATIVE EXAMPLES 1 THROUGH 3

In a manner analogous to Example 1, other copolymers were prepared. The conditions employed and the results are shown in Table 1 below.

In the table, comparative examples are also shown for comparison purposes.

TABLE 1

| | | | | | Resol-Producing Step | | | Resol Mixture | | |
|---|---|---|---|---|---|---|---|---|---|---|
| | | | | | 37% Formalin | Additional | | | | Added |
| Example No. | Phenols | Parts | Water Parts | NaOH Parts | Amount Parts | Dropping Conditions °C./hrs | Stirring Conditions °C./hrs | Unreacted Formalin mol % | Cooling Temperature °C. | Amount of Ethanol Parts |
| 2 | m-Cresol | 216 | 250 | 1.6 | 324 | 50/3 | 50/2 | 10 | 25 | 0 |
| 3 | m-Cresol | 216 | 250 | 1.6 | 283.5 | 55/3 | 55/2 | 7 | 25 | 0 |
| 4 | 3,5-Xylenol | 244 | 340 | 4 | 324 | 50/3 | 50/1 | 5 | 25 | 250 |
| 5 | m-Methoxyphenol m-Cresol | 124 108 | 250 | 0.8 | 141.7 | 30/4 | 30/6 | 9 | 10 | 0 |
| 6 | 3,5-Xylenol | 122 | 300 | 4 | 324 | 60/3 | 60/1 | 5 | 25 | 100 |
| 7 | 3,5-Xylenol | 244 | 340 | 1.6 | 194.6 | 50/3 | 50/3 | 8 | 20 | 250 |
| Comparative 1 | p-Cresol | 108 | 140 | 1.2 | 162 | 80/4 | 80/6 | 10 | 25 | 100 |
| Comparative 2 | p-Chlorophenol | 128.5 | 170 | 8 | 162 | 80/2 | 80/2 | 8 | 25 | 200 |
| Comparative 3 | m-Cresol | 216 | 250 | 1.6 | 324 | 35/3 | 35/2 | 35 | 20 | 0 |

| | | | | Novolak-Producing Step | | | | | |
|---|---|---|---|---|---|---|---|---|---|
| | | | | | Resol Mixture Dropping | Additional Stirring | | Copolymer | |
| Example No. | Resorcinols | Parts | Water Parts | Oxalic Acid Parts | Conditions °C./hrs | Conditions °C./hrs | Yield Parts | Average Molecular Weight | Named As |
| 2 | Resorcinol | 484 | 275 | 5.2 | 70/3 | 70/3 | 1550 (49 wt %) | 400 | B |
| 3 | Resorcinol | 440 | 275 | 5.1 | 70/3 | 70/3 | 690 | 480 | C |
| 4 | Resorcinol | 440 | 660 | 8 | 70/3 | 70/3 | 730 | 520 | D |
| 5 | Resorcinol | 220 | 250 | 2.6 | 70/3 | 70/3 | 360 | 540 | E |
| 6 | Resorcinol | 440 | 660 | 8 | 70/3 | 70/3 | 710 | 520 | F |
| 7 | Resorcinol | 220 | 200 | 4.6 | 90/3 | 90/3 | 480 | 460 | G |
| Comparative 1 | Resorcinol | 220 | 140 | 3.0 | 70/3 | 70/3 | 353 | 520 | H |
| Comparative 2 | Resorcinol | 220 | 170 | 10.8 | 70/2 | 70/3 | 385 | 550 | I |
| Comparative 3 | Resorcinol | 440 | 250 | 5.1 | 70/3 | 70/3 | 680 | 700 | J |

EXAMPLE 1

324 parts of 37% formalin was gradually added dropwise over a period of 3 hours to a mixture of 216 parts of m-cresol, 250 parts of water and 1.6 parts of sodium hydroxide which were being stirred in a 1000 ml four-necked flask at a temperature of 65° C. The resultant mixture was further stirred at the same temperature for another 3 hours, until an amount of unreacted formalin was reduced to 3% of the charged amount of formalin, and then cooled to a temperature of 25° C. to stop the reaction.

Subsequently, 440 parts of resorcinol, 250 parts of water and 5.1 parts of oxalic acid were charged in a 2000 ml separable flask and stirred at a temperature of

COMPARATIVE EXAMPLE 4

324 parts of 37% formalin was gradually added dropwise over 3 hours to a mixture of 216 parts of m-cresol, 250 parts of water and 1.6 parts of sodium hydroxide in a 2000 ml separable flask, while stirring, at a temperature of 85° C. The reaction mixture was further stirred at the same temperature for 2 hours, until all the charged formalin was consumed, and then cooled to a temperature of 25° C. to stop the reaction.

Thereafter, 440 parts of resorcinol, 250 parts of water and 5.1 parts of oxalic acid were gradually added to the m-cresol.formaldehyde precondensate mixture in the separable flask under sufficient stirring, and, thereafter, the temperature was raised to 90° C. over a period of 3 hours. The reaction mixture was further stirred at the same temperature for 6 hours, water was removed from the mixture, and, then, unreacted m-cresol and resorcinol were removed by vacuum distillation. Thus, 670 parts of a m-cresol.resorcinol.formaldehyde copolymer (S) was obtained.

The obtained resin had a softening point of 180° C.

EXAMPLES 9 THROUGH 14 AND COMPARATIVE EXAMPLE 5

In a manner analogous to Example 8, other copolymers were prepared. The conditions employed and the results are shown in Table 2 below.

In the table, a comparative example is also shown for comparison purposes.

TABLE 2

| | Resol-Producing Step | | | | | | Resol Mixture | | |
|---|---|---|---|---|---|---|---|---|---|
| | | | | | 37% Formalin | Additional | | | Added |
| Example No. | Phenols | Parts | Water Parts | NaOH Parts | Amount Parts | Dropping Conditions °C./hrs | Stirring Conditions °C./hrs | Unreacted Formalin mol % | Cooling Temperature °C. | Amount of Ethanol Parts |
| 9 | m-Cresol | 216 | 250 | 1.6 | 324 | 60/3 | 60/2 | 5 | 25 | 0 |
| 10 | m-Cresol | 216 | 250 | 1.6 | 324 | 60/3 | 60/2 | 5 | 25 | 0 |
| 11 | 3,5-Xylenol | 244 | 340 | 4 | 324 | 50/3 | 50/1 | 5 | 25 | 250 |
| 12 | m-Methoxyphenol m-Cresol | 124 108 | 250 | 0.8 | 141.7 | 30/4 | 30/6 | 9 | 10 | 0 |
| 13 | 3,5-Xylenol | 122 | 300 | 4 | 324 | 60/3 | 60/1 | 5 | 25 | 100 |
| 14 | m-Methoxyphenol | 248 | 250 | 1.6 | 283.2 | 30/4 | 30/6 | 7 | 10 | 0 |
| Comparative 5 | m-Cresol | 216 | 250 | 1.6 | 324 | 35/3 | 35/2 | 35 | 20 | 0 |

| | Novolak-Producing Step | | | | | | | | |
|---|---|---|---|---|---|---|---|---|---|
| | | | | | Resol Mixture Dropping | Additional Stirring | | Copolymer | |
| Example No. | Resorcinols | Parts | Water Parts | Oxalic Acid Parts | Conditions °C./hrs | Conditions °C./hrs | Yield Parts | Average Molecular Weight | Named As |
| 9 | ALKYRES | 508 | 580 | 5.4 | 70/3 | 70/3 | 770 | 730 | L |
| 10 | 5-Methyl-resorcinol | 434 | 500 | 5.1 | 70/3 | 70/3 | 700 | 700 | M |
| 11 | ALKYRES | 508 | 580 | 5.4 | 70/3 | 70/3 | 798 | 720 | N |
| 12 | ALKYRES | 254 | 250 | 2.8 | 70/3 | 70/3 | 392 | 670 | O |
| 13 | ALKYRES Resorcinol | 508 220 | 580 | 5.4 | 70/3 | 70/3 | 783 | 720 | P |
| 14 | ALKYRES | 290 | 580 | 5.6 | 90/3 | 90/3 | 770 | 600 | Q |
| Comparative 5 | ALKYRES | 508 | 660 | 5.8 | 70/3 | 70/3 | 810 | 800 | R | and an average molecular weight of 750.

EXAMPLE 8

324 parts of 37% formalin was gradually added dropwise over a period of 3 hours to a mixture of 216 parts of m-cresol, 250 parts of water and 1.6 parts of sodium hydroxide which was being stirred in a 1000 ml four-necked flask at a temperature of 50° C. The resultant mixture was further stirred at the same temperature for another 3 hours, until the amount of unreacted formalin was reduced to 10% of the charged amount of formalin, and then cooled to a temperature of 25° C. to stop the reaction.

Subsequently, 580 parts of an alkylresorcinol mixture (ALKYRES), 660 parts of water and 5.8 parts of oxalic acid were charged in a 2000 ml separable flask and stirred at a temperature of 70° C., and the reaction mixture of m-cresol and formalin was gradually added dropwise over a period of 3 hours to the mixture being stirred in the flask. The resultant mixture was further stirred at the same temperature for another 3 hours. Water in the system was removed and the unreacted m-cresol and alkyl-resorcinol mixture were removed by vacuum distillation to obtain 831 parts of m-cresol.alkyl-resorcinol.formaldehyde resin (K).

The obtained resin was a red-brown solid of a fusible oligomer having a softening point of 120° C. and an average molecular weight of 700.

REFERENCE EXAMPLE 1

The copolymer resins obtained in the Examples and Comparative Examples above were used as adhesives for polyester fiber and rubber. The results of the adhesive force evaluation and the testing methods will now be described.

(a) (i) Adhesive treatment liquids, containing a copolymer soluble in an aqueous ammonia, were prepared by mixing:

| | |
|---|---|
| an aqueous solution of a respective copolymer and | 40 parts |
| RFL | 60 parts |

The aqueous solution of a copolymer was prepared by dissolving the respective copolymer by using an aqueous ammonia and had a solid content of 15%.

(ii) Adhesive treatment liquids containing a copolymer insoluble in an aqueous ammonia were prepared by mixing:

| | |
|---|---|
| an aqueous dispersion of a respective copolymer and | 40 parts |
| RFL | 60 parts |

The aqueous dispersion of a copolymer was prepared by dispersing the respective copolymer in water using a laboratory sand grinder in the presence of an anionic surface active agent, DEMOL SSL (KAO-ATLAS Co.), and had a solid content of 15%.

RFL is a water dispersion having a solids content of 15% and is composed of, in parts:

| Water | 635.5 |
|---|---|
| Resorcinol | 20.5 |
| 37% formalin | 18 |
| 5% aqueous solution of sodium hydroxide | 32 |
| Vinylpyridine latex (41%) | 294 |

(b) Unvulcanized rubber is composed of, in parts:

| Smoked sheet | 30 |
|---|---|
| Styrene-butadiene rubber | 70 |
| Carbon black | 40 |
| Stearic acid | 1.5 |
| Process oil (petroleum) | 5 |
| Zinc oxide | 5 |
| N—phenyl-β-naphthylamine | 1 |
| Benzothiazyl disulfide | 0.8 |
| Diphenylguanidine | 0.2 |
| Sulfur | 2 |

(c) Polyester fiber tire cord of 1500 d/2 (number of second twist: 40/10 cm, number of first twist: 40/10 cm) was used.

(d) Treating method

The polyester fiber tire cord (c) was dipped in the adhesive treatment liquid (a) and subjected to heat treatment under a constant tension at 240° C. for 2 minutes.

(e) Testing method

After the treated cord obtained by the treating method (d) was embedded in the unvulcanized rubber (b) and subjected to vulcanization at a temperature of 145° C. under a pressure of 100 kg/cm² for 30 minutes, the adhesive value was measured at room temperature according to H test.

(f) The results of the measurement are shown in Table 3. It is apparent from this table that the adhesive value of the copolymer obtained according to the present invention is superior to those of the known copolymers (Comparative Examples 1, 2 and 6). It is further apparent that the present process is highly superior to the known process in which an acid catalyst and a resorcinol are added to the resol precondensate mixture at the novolak-producing step (Comparative Example 4) and that when the amount of formaldehyde left unreacted is out of the range specified, according to the present invention, at the resol-producing step, the adhesive value is greatly reduced (Comparative Examples 3 and 5).

TABLE 3

| Preparing Method | Adhesive Value (kg) |
|---|---|
| Example 1; Resin A | 19.5 |
| Example 2; Resin B | 18.1 |
| Example 3; Resin C | 19.4 |
| Example 4; Resin D | 19.3 |
| Example 5; Resin E | 18.3 |
| Example 6; Resin F | 19.4 |
| Example 7; Resin G | 19.3 |
| Example 8; Resin K | 19.3 |
| Example 9; Resin L | 19.4 |
| Example 10; Resin M | 19.0 |
| Example 11; Resin N | 18.6 |
| Example 12; Resin O | 18.5 |
| Example 13; Resin P | 19.3 |
| Example 14; Resin Q | 19.3 |
| Comparative Example 1; Resin H | 16.0 |
| Comparative Example 2; Resin I | 15.8 |
| Comparative Example 3; Resin J | 16.0 |
| Comparative Example 4; Resin S | 12.0 |
| Comparative Example 5; Resin R | 16.0 |

TABLE 3-continued

| Preparing Method | Adhesive Value (kg) |
|---|---|
| Comparative Example 6; VULCABOND-E | 15.5 |

We claim:

1. A process for preparing a resorcinol copolymer, comprising reacting at least one phenol having the general formula,

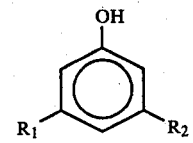

in which $R_1$ is —$CH_3$ or —$OCH_3$, and $R_2$ is hydrogen or —$CH_3$, with formaldehyde in an amount of 0.6 to 2.4 moles per mole of said phenol, in the presence of an alkaline catalyst, to obtain a resol-type precondensate containing 1 to 30%, based on the initial amount, of residual unreacted formaldehyde, and, then, adding said resol-type precondensate to a mixture of an acid, equivalent to said alkaline catalyst or 10 mol % excess with reference to said phenol, and at least one member selected from the group consisting of resorcinol and lower alkyl-substituted resorcinols, in an amount of 0.4 to 2.5 moles per mole of said phenol, to effect co-condensation.

2. A process according to claim 1, wherein the alkaline catalyst is used in an amount of 0.01 to 10 mol % based on said phenol.

3. A process according to claim 2, wherein the amount of the alkaline catalyst is 0.3 to 5 mol % based on said phenol.

4. A process according to claim 1, wherein the alkaline catalyst is selected from hydroxides and carbonates of alkali metals and alkaline earth metals.

5. A process according to claim 1, wherein said phenol is selected from m-cresol, 3,5-xylenol and m-methoxyphenol.

6. A process according to claim 1, wherein the resol-type precondensate contains 2 to 10%, based on the initial amount, of residual unreacted formaldehyde.

7. A process according to claim 1, wherein formaldehyde is used in an amount of 0.8 to 2.2 moles per mole of said phenol.

8. A process according to claim 1, wherein the reaction of said phenol with formaldehyde is effected at a temperature of 10° to 90° C.

9. A process according to claim 8, wherein the reaction temperature is 25° to 70° C.

10. A process according to claim 1, wherein the reaction of said phenol with formaldehyde is effected for 1 to 24 hours.

11. A process according to claim 10, wherein the reaction time is 2 to 10 hours.

12. A process according to claim 1, wherein the alkyl substituent of the lower alkyl-substituted resorcinols has 1 to 4 carbon atoms.

13. A process according to claim 1, wherein the lower alkyl-substituted resorcinols are selected from 5-methylresorcinol, 5-ethylresorcinol, 5-propylresorcinol, 5-isopropylresorcinol, 5-butylresorcinol and a mixture of lower alkyl-substituted resorcinols.

14. A process according to claim 1, wherein the acid is selected from hydrochloric acid, sulfuric acid, nitric acid, formic acid, oxalic acid, acetic acid and p-toluenesulfonic acid.

15. A process according to claim 1, wherein the acid is 0.1 to 3 mol % excess with reference to said phenol.

16. A resorcinol copolymer produced by the process as claimed in claim 1.

* * * * *